Nov. 8, 1955    J. J. BALDINE    2,722,986
BRAKING AND STEERING CONTROL MECHANISM
FOR ONE-MAN ARMORED TANK
Filed April 2, 1951    2 Sheets-Sheet 1

Joseph James Baldine
INVENTOR.

BY
*Clarence A. O'Brien
and Harvey B. Jackson*
Attorneys

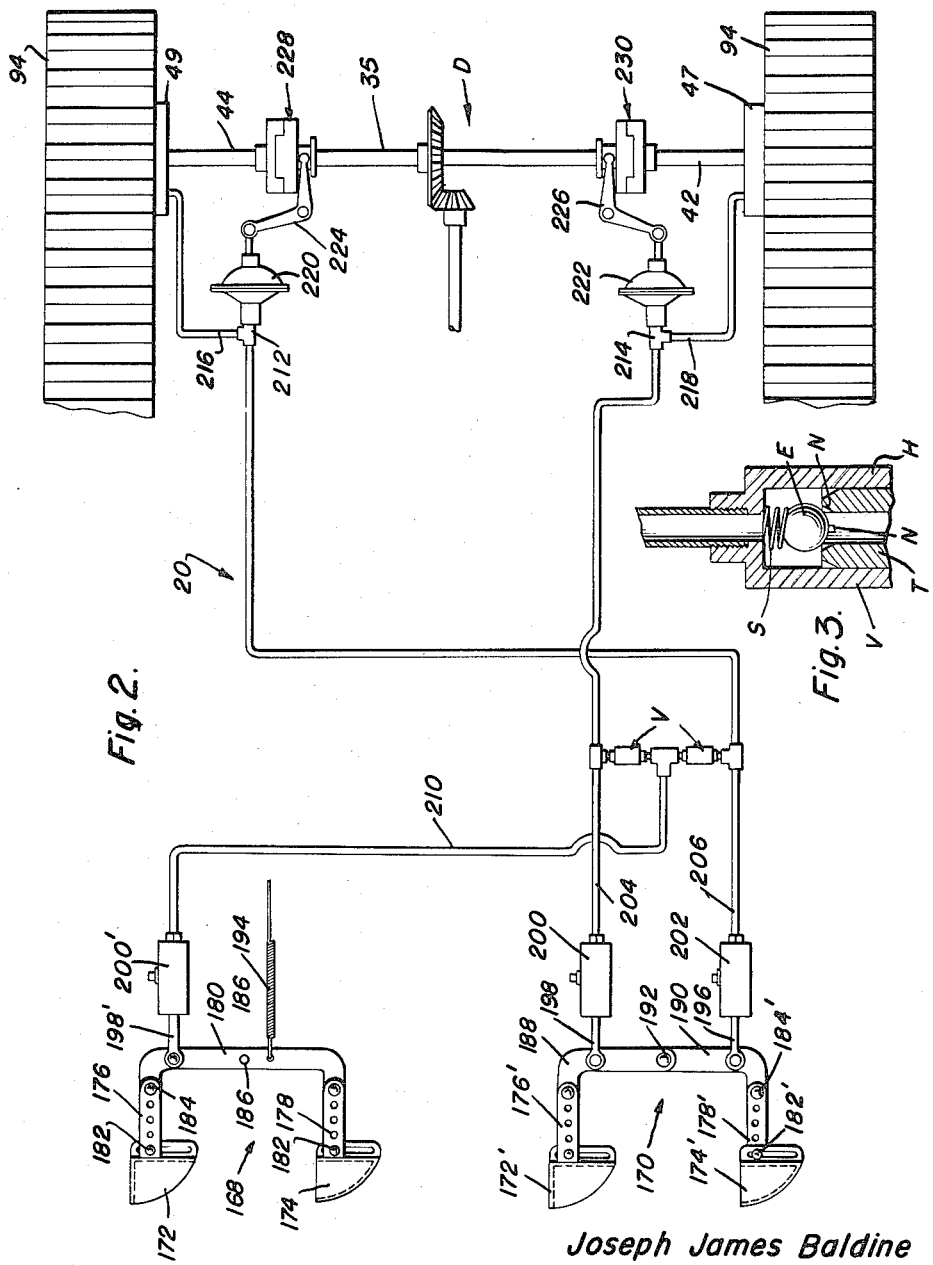

United States Patent Office 2,722,986
Patented Nov. 8, 1955

2,722,986

BRAKING AND STEERING CONTROL MECHANISM FOR ONE-MAN ARMORED TANK

Joseph James Baldine, Hubbard, Ohio

Application April 2, 1951, Serial No. 218,764

4 Claims. (Cl. 180—6.7)

The present invention relates to improvements in armored tanks and more particularly to tanks that can be operated by a single man.

An object of the present invention is to provide an improved one-man tank that can be driven by manipulation of foot bracket at the same time the operator's hands are being employed for firing the machine gun of the tank.

A further object of the present invention is to provide a novel mechanism whereby manipulation of the foot bracket by pivoting in response to movement of the operator's feet can effect braking of the endless track on either side of the tank for turning and can effect braking of the endless track on both sides of the tank for stopping the same.

Still another object of the present invention resides in the provision of a connection between one of said foot brackets and the throttle of the tank whereby the speed of the tank can be controlled by foot actuation of the one bracket.

Other objects and advantages reside in the details of construction and operation as more fully hereinafter described and claimed, reference being had to the accompanying drawings forming part hereof, wherein like numerals refer to like parts throughout, and in which:

Figure 2 is a diagrammatic view illustrating the steering and braking mechanism employed in conjunction with the present invention; and, Figure 3 is an enlarged fragmentary detail sectional view showing the check valve that is used in the fluid system.

Figure 1:
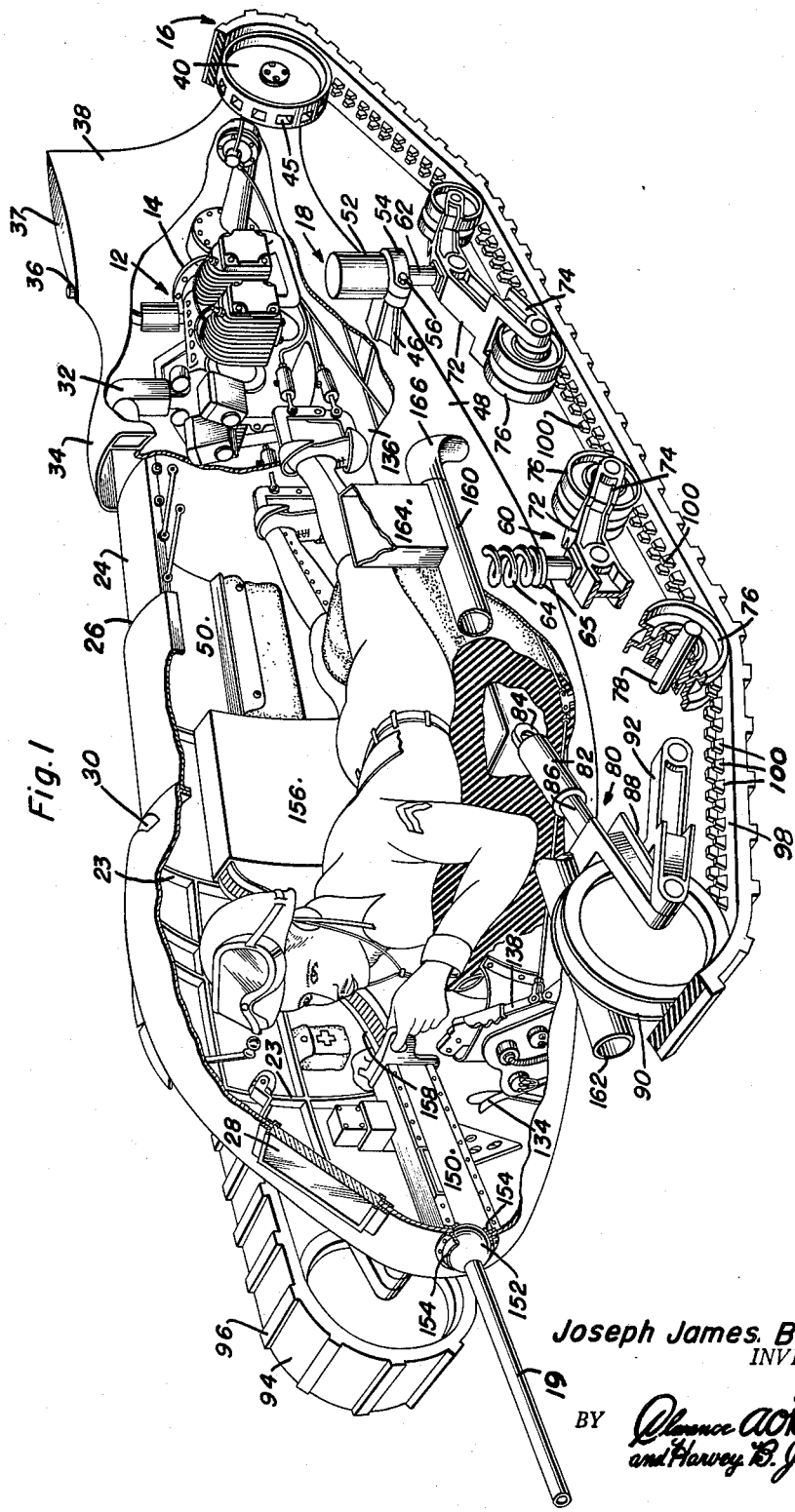
Figure 1 is a perspective view showing an operator in position within the tank and with parts of the tank broken away for the convenience of explanation.

Referring now to the drawings in detail, wherein for the purpose of illustration, there is disclosed a preferred embodiment of the present invention comprising a one-man tank having a prime mover 12, fluid transmission 14, endless track 16, shock absorbing means 18 and armament 19. The invention has as an important feature the steering mechanism 20, shown best in Figure 2.

The tank 10 is formed with a shell of pre-selected thickness armored plate, with reinforcing ribs 23 rigidifying the shell and an entrance hatch 24 slidably closing the opening 26 at the upper portion of the shell. The forward end of the shell is provided with a bullet-proof window 28 and upper ventilation openings 30.

The prime mover 12 of the tank 10 is located in the aft end and is an aircraft-type, four-cylinder, horizontally disposed, air-cooled engine. The intake for the engine is at 32 and terminates at the shell beneath the hood portion 34. The exhaust 36 of the engine extends upwardly and terminates adjacent the upper surface 37 of the tail fin 38 of the tank.

The drive shaft of the engine 12 is connected to the fluid transmission 14 which is of conventional form, such as is employed in present fluid drive vehicles, thereby eliminating shifting and giving even acceleration.

The driven shaft of the fluid transmission 14 is interconnected with rear axle 35 as at D which is of the crawler tractor type with two multiple disk clutch and brake arrangements associated therewith.

The pair of drive sprockets 40 are fixedly secured to the splined rear axle outer sections 42 and 44 for rotation therewith. As seen in Figure 1, the drive sprockets have recesses 45 in their peripheries for receiving the lugs to be hereinafter described. Brake drum 47 and band assembly are associated with these sprockets for stopping their rotation.

It will be seen that the shell has a pair of outstanding brackets 46 secured to opposite side walls 48 and 50 thereof. Each of the brackets has a recessed outer end with a clamp bracket element 54 complementing the brackets 46 and connectible thereto. Cylinders 52 having open bottom walls, are clampingly received within the clamping bracket elements 46 and 54, with bolts 56 connecting the bracket elements.

Bogie idler units 60 resiliently support the tank by the plungers 62 with the piston heads 65 reciprocably received in the cylinders 52 and engaging coil springs 64 disposed therein.

The idler units 60 are further comprised of V-shaped bearing brackets 72 having U-shaped ends 74. Grooved rollers 76 are rotatably received on bearing shafts 78 fixedly carried by said U-shaped ends 74.

The front idler assemblies 80 embody the use of shock absorbers 82 which are pivotally carried by the tank shell at 84. Each of the shock absorbers 82 has a plunger 86 terminating in a U-shaped bearing support 88 for the grooved roller 90. The rollers 90 are also rotatably carried on the pivotally mounted support brackets 92 which have U-shaped ends embracing the U-shaped ends 88 of the plungers 86.

Thus, the endless track means 16 can be rotatably carried by the forward idler and bogie idler assemblies and the drive sprockets and driven by the drive sprockets for propelling the tank. With the forward idler assemblies described, the tank can effectively pass over obstacles.

The endless track means 16 includes a rubber-like endless band 94 having a plurality of transversely extending ribs 96 formed thereon. The back side 98 of the band 94 has a plurality of metallic lugs 100 integrally formed therewith for engagement in the recesses 45 of the above-described drive sprocket 40. The lugs 100 are also adapted to be received in the grooves of the rollers 76 and 90 for guiding the track.

The armament of the tank is shown in Figure 1 as including a machine gun 150 universally mounted in the nose of the tank by means of the ball 152 and socket elements 154. The magazine 156 is secured to the side wall of the tank for feeding the machine gun belt 158.

The tank is also provided with secondary armament which includes a rocket launcher 160 including the tube 162 and reservoir 164.

A sight is provided in the interior of the tank for the operator to direct the rocket. The aft-ends of the rocket tubes are downwardly arcuated as at 166 to minimize detection of the tank during night firing.

Looking now at Figure 2, the steering and braking mechanism 20 will now be described. A pair of foot brackets 168 and 170 are provided, bracket 168 including heel and toe receiving elements 172 and 174, respectively, adjustably secured to the arms 176 and 178 of the lever element 180 by means of the bolts 182 and 184. The lever element is pivotally supported within the tank on the pivot pin 186.

The other or second foot bracket 170 has heel and toe receiving elements 172' and 174' adjustably carried by the arms 176' and 178' by means of bolts 182' and 184'. Each of the arms 176' and 178' has a lever element 188 or 190 to which it is attached, both elements 188 and 190 being pivotally carried by the pivot pin 192 and being separately pivotable.

The lever 180 has a resilient connection 194 with the throttle of the engine for control of the same.

The lever elements 188 and 190 have plungers 196 and 198 engaged in the hydraulic cylinders 200 and 202 for selectively applying pressure to the brake bands of the brake drums 47 and 49. Pipes 204 and 206 interconnect the cylinders 200 and 202 with the brake bands.

The element 180 is similarly provided with a plunger 198' and cylinder 200' with a pipe 210. A pair of ball check valves V are interposed between the pipe 210 and the pipes 204 and 206 whereby pressure can be supplied to both pipes upon pivoting of the foot bracket 168, thereby stopping the tank. Pivoting of the foot bracket 170 can selectively apply the brakes to either side of the tank for steering the same.

The pipes 204 and 206 have T-fittings 212 and 214 whereby pressure fluid can pass through lines 216 and 218 to the brakes and also provide pressure to the diaphragm housings 220 and 222. Bellcranks 224 and 226 are operated by the diaphragms in response to pressure for engaging and disengaging the clutches 228 and 230. Thus, upon applying the brakes of either or both sprocket wheels, the clutch for that wheel will be disengaged and steering or stopping of the tank will be effected.

The check valves V each include a housing H in which there is positioned a tube T. One end of the tube T is provided with notches N constituting passages when a ball valve E is seated against the notched end of the tube T. A spring S urges the valve E against the notched end of the tube as illustrated in Figure 10. The valve structure V is more specifically described in U. S. Patent No. 1,151,329.

Obviously other check valves may be substituted for the one described as long as the liquid may pass back into the reservoirs after the brakes have been actuated.

Having described the invention, what is claimed as new is:

1. In an endless track vehicle having a rear driven axle and including a brake drum at each side and having three pressure cylinders, two of said pressure cylinders each individually controlling one of said brake drums, the third of said pressure cylinders simultaneously controlling both of said brake drums, a brake and steering control mechanism including a pair of foot bracket means supported within the vehicle and adapted to receive the feet of the operator, one of said foot bracket means being interconnected with the third pressure cylinder of the brake drums on both sides of the vehicle for applying the brakes when in a first pivoted position, the other of said foot bracket means having connections to each of the two brake cylinders whereby pressure to the individual brake cylinders can be applied upon pivoting of said other of said foot bracket means to either of two pivoted positions, said one of said foot bracket means including a lever pivotally carried by the vehicle, heel and toe receiving elements secured to opposite ends of said lever whereby pivoting of said lever can be effected by depression of the heel and toe receiving elements and a throttle connection between said lever and the throttle of the vehicle, said throttle connection being pivotally secured to said lever at the end opposite to the connection to the brake cylinders, the rear axle of the vehicle having a pair of clutches located on opposite sides of a drive connection to said rear axle, and bellcrank means connected to said clutches and actuated selectively upon predetermined pivoting of the other of said foot bracket means and actuated simultaneously upon predetermined pivoting of said one foot bracket means.

2. In an endless track vehicle having a rear driven axle and including a brake drum at each side and having three pressure cylinders, two of said pressure cylinders each individually controlling one of said brake drums, the third of said pressure cylinders simultaneously controlling both of said brake drums, a brake and steering control mechanism including a pair of foot bracket means supported within the vehicle and adapted to receive the feet of the operator, one of said foot bracket means being interconnected with the third pressure cylinder of the brake drums on both sides of the vehicle for applying the brakes when in a first pivoted position, the other of said foot bracket means having connections to each of the two brake cylinders whereby pressure to the individual brake cylinders can be applied upon pivoting of said other of said foot bracket means to either of two pivoted positions, the other of said foot bracket means including a pair of lever arms pivotally supported on a common fulcrum pin within the vehicle, one of said lever arms having a heel-receiving element secured thereto, and the other of said lever arms having a toe-receiving element secured thereto, the rear axle of the vehicle having a pair of clutches located on opposite sides of a drive connection to said rear axle, and bellcrank means connected to said clutches and actuated selectively upon predetermined pivoting of the other of said foot bracket means and actuated simultaneously upon predetermined pivoting of said one foot bracket means.

3. In an endless track vehicle having a rear driven axle and including a brake drum at each side and having three pressure cylinders, two of said pressure cylinders each individually controlling one of said brake drums, the third of said pressure cylinders simultaneously controlling both of said brake drums, a brake and steering control mechanism including a pair of foot bracket means supported within the vehicle and adapted to receive the feet of the operator, one of said foot bracket means being interconnected with the third pressure cylinder of the brake drums on both sides of the vehicle for applying the brakes when in a first pivoted position, the other of said foot bracket means having connections to each of the two brake cylinders whereby pressure to the individual brake cylinders can be applied upon pivoting of said other of said foot bracket means to either of two pivoted positions, the other of said foot bracket means including a pair of lever arms pivotally supported on a common fulcrum pin within the vehicle, one of said lever arms having a heel-receiving element secured thereto, and the other of said lever arms having a toe-receiving element secured thereto, each of said lever arms being individually connected with the brake cylinder for the brake drum on one side of the vehicle whereby actuation of the brakes on one side of the vehicle can be selectively applied for steering the vehicle, the rear axle of the vehicle having a pair of clutches located on opposite sides of a drive connection to said rear axle, and bellcrank means connected to said clutches and actuated selectively upon predetermined pivoting of the other of said foot bracket means and actuated simultaneously upon predetermined pivoting of said one foot bracket means.

4. In an endless track vehicle having a rear driven axle and including a brake drum at each side and having three pressure cylinders, two of said pressure cylinders each individually controlling one of said brake drums, the third of said pressure cylinders simultaneously controlling both of said brake drums, a brake and steering control mechanism including a pair of foot bracket means supported within the vehicle and adapted to receive the feet of the operator, one of said foot bracket means being interconnected with the third pressure cylinder of the brake drums on both sides of the vehicle for applying the brakes when in a first pivoted position, the other of said foot bracket means having connections to each of the two brake cylinders whereby pressure to the individual brake cylinders can be applied upon pivoting of said other of said foot bracket means to either of two pivoted positions, the other of said foot bracket means having connections to each of the brake cylinders whereby pressure to the individual brake cylinders can be applied upon pivoting of said other of said foot bracket means to either of two pivoted positions, the rear axle of the vehicle having a pair of clutches, and bellcrank means connected to said clutches and actuated selectively upon predetermined pivoting of the other of said foot bracket means, and actuated simultaneously upon predetermined pivoting of said one foot bracket means.

References Cited in the file of this patent

UNITED STATES PATENTS

| | | |
|---|---|---|
| 1,348,558 | Garner et al. | Aug. 3, 1920 |
| 1,662,306 | Fokker et al. | Mar. 13, 1928 |
| 2,254,192 | White | Aug. 26, 1941 |
| 2,254,890 | Gardiner | Sept. 2, 1941 |
| 2,319,690 | Karpen | May 18, 1943 |
| 2,349,535 | Baldine | May 23, 1944 |
| 2,352,593 | Allin | July 4, 1944 |
| 2,371,788 | Weeber | Mar. 20, 1945 |
| 2,384,182 | Lewis | Sept. 4, 1945 |
| 2,416,478 | Harbers | Feb. 25, 1947 |